June 24, 1952 A. H. ROSENTHAL 2,601,328

COLOR TELEVISION

Filed Sept. 20, 1947

INVENTOR
ADOLPH H. ROSENTHAL
BY J. O. Allen,
ATTORNEY

Patented June 24, 1952

2,601,328

UNITED STATES PATENT OFFICE 2,601,328

COLOR TELEVISION

Adolph H. Rosenthal, New York, N. Y., assignor, by mesne assignments, to Skiatron Electronics and Television Corporation, a corporation of New York Application September 20, 1947, Serial No. 775,175

20 Claims. (Cl. 178—5.4)

Figures 1, 2, 3, 4, 5, 6, 7:
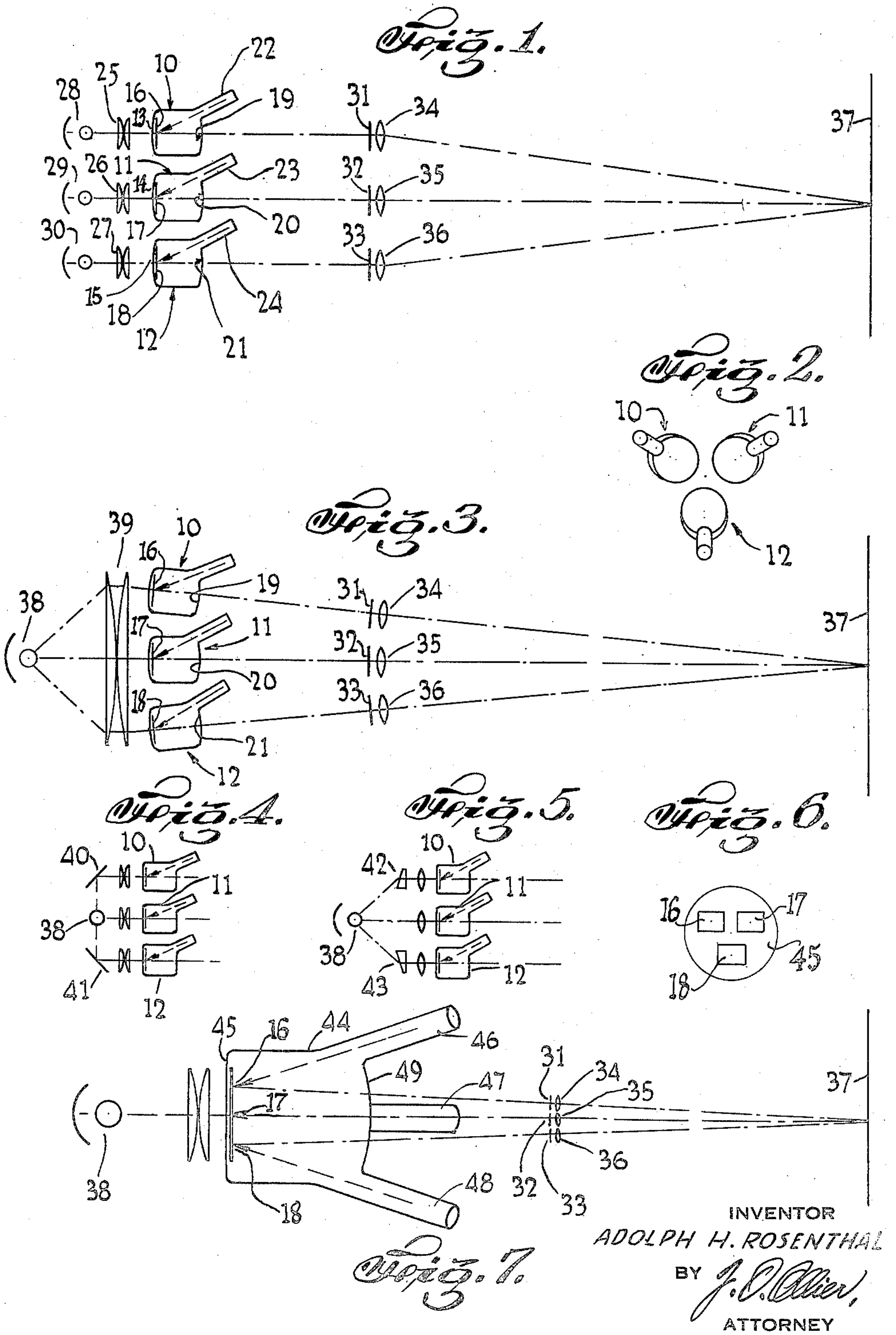

This invention relates to a method and apparatus for reproducing electric signals representative of intelligence including colors. In particular the invention relates to a method and system for reproducing color television using additive color mixture in which the partial color signals are received either simultaneously or successively.

It is an object of the invention to reproduce by projection upon a viewing screen intelligence including colors without the use of movable parts, such as rotating color filter discs.

It is a further object of the invention to reproduce electric signals representative of partial colors by modulating a flow of light of the partial color and to project modulated flows of light either simultaneously or successively upon a viewing screen without the use in the reproducer of movable members, such as rotating color filter discs.

It is still a further object of the invention to translate electric signals representative of intensity values of different partial colors into local changes of transparency of stationary screens in which such changes persist for a desired period, to pass light of such different partial colors through the respective screens and modulate its intensity values accordingly, and to project the modulated light of those partial colors upon the same area of a viewing screen to thereby obtain combined color effects without the use of movable members.

These and other objects of the invention will be more clearly understood when the specification proceeds with reference to the drawings in which rather schematically and by way of exemplification, Fig. 1 shows a three cathode ray tube arrangement with separate sources of light for each tube, Fig. 2 the relative arrangement of the transparency controlled screens of the tubes shown in Fig. 1, Figs. 3, 4 and 5 modified three cathode ray tube arrangements having a common light source, Fig. 7 a single cathode ray tube in which three screen areas intended to reproduce different partial colors are arranged, and Fig. 6 the relative positions of the screens.

According to the invention, electric signals representative of selected partial colors (video signals) such as, for instance, the fundamental colors red, blue and green, are translated upon corresponding ionic crystal screen areas or layers arranged in evacuated confined space, by controlling the intensity of an electron beam scanning the respective screen or layer. While the transparency of an elemental area or picture point of a screen or layer substantially of ionic crystal material remains unaffected if the intensity of the beam impinging thereon is zero, it becomes the more opaque the greater the intensity is of the impinging beam. The greater the brightness is of the partial color to be reproduced in an elemental screen area, the smaller has to be the intensity of the beam impinging upon it. This is accomplished by a negative modulation of the intensity of the cathode ray beam for the partial color to be reproduced.

There can also be applied a positive modulation of the intensity of the cathode ray beam impinging upon a screen substantially of ionic crystal material. In such case the screen is normally opaque when and wherever not impinged by an electron beam, and the opacity of elemental areas impinged by a modulated beam of a proper minimum intensity will be reduced in accordance with the increase of the intensity of the beam above that minimum value. I have described these conditions in more detail in my patent No. 2,330,171.

Negative control modulations of the cathode ray beam are preferred, and the following description will refer to this kind of control with the understanding that a positive modulation can be applied to similar final effects.

I have described in my earlier Patent No. 2,330,172, a color television receiving system based on the subtractive method according to which a light from a substantially white light source passes seriatim screens or layers substantially of ionic crystal material in which the partial colors are reproduced. In contradistinction thereto, the present invention is concerned with an additive method applicable to both simultaneous or successive standards.

Referring to Figs. 1 and 2 there are shown three cathode ray tubes 10, 11, 12 having glass envelopes provided with opposite windows 13, 14, 15 and 19, 20, 21 respectively. Inside the set of windows 13, 14, 15, edgewise-spaced layers or screens of ionic crystal material 16, 17, 18 are arranged or applied, for instance in any of the manners described in my Patent No. 2,330,171. Each tube is provided with a neck 22, 23, 24 in which the usual electron gun, accelerating electrodes and control means, such as a grid, for modulating the intensity of an electron beam emitted by the gun are arranged. There may also be a conductive layer or coating contacting the edge of a screen and extending over an adjacent portion of the tube; such coating inside the envelope is usually of graphite and may form an accelerating electrode. There are further provided electrostatic means inside or electromagnetic means outside each tube for deflecting the electron beam to cause the scanning of each screen or layer along picture lines and frames or any other desired track. All these means just referred to are conventional, described and shown in more detail in my above mentioned patent, do not form per se subject matter of the present invention and are therefore not illustrated in the drawings, and so are controlling means, if desired, of the velocity at which opacities created in a screen by an impinging beam travel across the screen layer.

Electric signals representative of the brightness values of a selected partial color are received and translated upon the controlling means for the intensity of the electron beams in the respective tube. For instance, video signals representative of the partial color red are translated upon the control arrangement of tube 10, video signals representative of the partial color blue upon the control arrangement of tube 11, and video signals representative of the partial color green upon the control arrangement of tube 12. Thus the video signals control the creation in the screen layers of the respective tubes of local opacities which increase with the intensity of the signal controlled beam. Depending upon the kind of ionic crystal material or mixture of those materials used for the screen layers, the opacities will appear substantially black. Therefore in each of the screen layers 16, 17, and 18, a kind of black-and-white fugitive reproduction of the transmitted intelligence, in particular picture, of the respective partial color is effected.

In front of each window 13, 14, 15, a condenser lens system 25, 26, 27 is arranged and light sources with reflectors 28, 29, 30 are arranged in front of the condenser lens systems. Each of the light sources emits substantially white light comprising the entire visible color spectrum which is directed by the condenser lenses upon and through the screen layers 16, 17, 18, respectively, where the uniform flow of light is modulated according to the changes of transparency brought about in the respective screen layer in the manner hereinbefore described. The thus modulated beams or flows of light are passed through filters 31, 32, 33 in front of projection lens systems 34, 35, 36. Filter 31 permits only a suitable red light to pass, filter 32 a suitable blue light and filter 33 a suitable green light in the assumed case that video signals representative of the colors named are impressed upon the control grids of the tubes 10, 11, 12 in the order stated. Therefore the modulated flow of light emerging from window 19 will be converted to a modulated flow of red light by filter 31 and projected by lens system 34 upon the viewing or projection screen 37. Similarly blue and green modulated light will emerge respectively from filters 32 and 33 and be projected by lens systems 35 and 36 and the three light beams will be combined upon the same screen area of viewing screen 37, all the three partial color pictures being imaged upon screen 37 in exact registry.

If a standard of simultaneous color transmission is utilized, the projected partial color pictures will be superimposed upon the same area of screen 37 and add up to the true color of the transmitted picture or intelligence.

It should be understood that any number and kind of partial colors can be used for the purposes of the invention; if there be more than three partial colors, the number of cathode ray tubes (screen layers) has to be increased accordingly.

The tubes can be arranged relative to one another in any desired manner provided that by the cooperation of the lens systems shown for the tubes, the picture is projected upon the same area of the viewing screen 37, and all the partial color pictures are in registry. For instance, the tubes with their light sources and condenser systems can be so arranged that their screens 16, 17, 18 are spaced side by side at the corners of a triangle of equal sides, Fig. 2.

It should be understood that the filters can be arranged at any other place than shown in the path of the light from sources 28, 29, 30.

The arrangement of Fig. 3 differs from that illustrated in Fig. 1 only in that a common light source (or sources) 38 with reflector is used back of a single condenser lens system 39 back of the tubes 10, 11, 12 and their screen layers 16, 17, 18.

The arrangement of Fig. 4 differs from that illustrated in Fig. 3 only in that the common light source 38 for the three tubes 10, 11, 12 passes light directly through a condenser lens system 26 upon screen layer 17 and to the screen layers 16, 18 by means of reflecting mirrors 40, 41 and interposed condenser lens systems 25, 27.

In the modification shown in Fig. 5, light from the common source (or sources) 38 is passed to screen layer 17 through an interposed condenser lens system and to the screen layers 16, 18 by means of suitably shaped preferably achromatic prisms 42, 43 and interposed condenser lens systems.

Fig. 7 proposes to use a single glass envelope 44 inside the window 45 of which the screen layers 16, 17, 18 are arranged. By the use of a stencil placed inside the window while it is exposed, for instance, to vapors of the ionic crystal material or materials which are to be deposited thereon to form the screen layers, three separate screens of ionic crystal material of equal composition, thickness and crystal structure (microcrystalline structure) can be produced. The resulting active screen areas on window 45 are illustrated in Fig. 6. There are provided three necks 46, 47, 48 with electron guns to project modulated electron beams upon the screen layers 16, 17, 18 inside the common glass envelope 44. The three streams of light passing the screen layers 16, 17, 18 in tube 44 are modulated in the manner hereinbefore described with reference to Figs. 1, 3, 4 and 5 and eventually projected upon viewing screen 37 in such a way that the pictures in partial colors are in registry and superimposed.

Instead of producing individual screens 16, 17, 18 inside window 45 (or 49) also one continuous screen layer including those areas can be deposited or arranged, and the areas scanned by the beams produced in the necks 46, 47, 48. If desired, such a single screen can also be covered by a shield of metal or other material of a kind and thickness to prevent the penetration of the cathode ray beam which leaves open desired areas for impingement by the respective beam corresponding to the areas shown in Fig. 6.

Although common means for applying biasing and accelerating voltages to the respective electrodes (whereby the last accelerating electrodes or the highest potential in the case of Fig. 7 can be common to all the three beams emerging from individual electron guns in the tube necks 46, 47, 48 and modulated by individual control grids)

can be used, it is mostly advisable to have individual adjusting means for the various voltages to be applied.

Registry of the partial color pictures on the screen 37 can be obtained in any of the exemplifications of the invention shown either optically by adjusting, for instance, the position of the projection lenses or electrically, for instance, by adjusting the deflecting means of one or the other or all the electron beams. Such adjustments are of particular utility in connection with the arrangement shown in Fig. 7 and if a single large screen layer is used, in that the individual areas of the pictures can be shifted and their sizes changed in a purely electrical manner and full registry obtained. The size of the individual color picture areas can be particularly adjusted by adjusting the scanning voltages.

The invention as described and illustrated is usable both for simultaneous transmission of the three partial color signals and when the latter are transmitted in succession, that is when one partial color is transmitted only during one third of a frame period as a maximum. In the latter case each of the three electron beams scans the corresponding screen layer completely within one third of a frame period as a maximum, and there is no scanning during the remaining two thirds of that period. As is explained in more detail in my earlier Patent 2,330,171, opacities created in a screen area require a certain finite and controllable time period before disappearing from the screen layer. Therefore, with successive transmission of partial colors, after a screen 16, 17, 18 has been fully scanned the opacities created in each screen during one third of a total frame period and representing the light intensities of the respective partial color, can be made to persist over the remaining two thirds of that period although there is no scanning at all of that screen layer. Therefore the light projected through each such screen will be modulated by the opacities thereof over the entire frame period and the three partial color pictures are superimposed in effect on the viewing screen during the entire frame period. Thereby disturbing color flicker is prevented. This is one of the outstanding advantages of the invention which cannot be obtained with any other system heretofore proposed.

It is further common to all the embodiments of the invention shown that they work entirely electrically or electronically and do not require any moving parts, such as rotating filter discs.

From the above it will also be understood that the arrangement of the invention can be used for any color transmission system whether of the simultaneous or sequential standard.

In case the various screen layers are produced of ionic crystal material or a mixture thereof which upon impingement by the cathode ray beam develops opacities of various densities or degree in the color of a partial color, the screen can act as a color filter as well and color filters in front of or behind a projection lens system or tube can be omitted. If the opacities have colors not exactly corresponding to the desired fundamental partial colors, compensation for their color can be provided by the arrangement of a proper color filter in the path of the light traversing such screen layer.

Similarly, if the color of light emitted by any of the sources corresponds to that of a desired partial color, filters in the path of that light can be omitted.

It should be understood that the invention is not limited to the exemplifications described or shown but is to be derived in its broadest aspects from the appended claims.

What I claim is:

1. In an additive color television system for producing color images, tube means having at least two target screens of alkali halide material, means for changing the transparency of each target screen according to partial color signals received, a viewing screen, means for passing beams of white light through said target screens and combining them upon an area of the viewing screen, the target screens being so positioned that each beam passes through only one such screen, and color filters in said beams of light corresponding to the partial colors represented by the signals.

2. A system as claimed in claim 1, in which the various screen layers are arranged in separate cathode ray tubes.

3. A system according to claim 1, in which the screen layers are arranged in one cathode ray tube.

4. A system as claimed in claim 1, in which the different screen layers are portions of a single ionic crystal screen layer, said screen layer portions being spaced side by side.

5. A system as claimed in claim 1, in which the light for the different light beams is produced by separate sources.

6. A system as claimed in claim 1, in which the light for different screen layers is produced by a common source.

7. A system as claimed in claim 6, in which the light produced by the common source is passed to the different screen areas through a common condenser lens system.

8. A system as claimed in claim 6, in which the light produced by the common source is directed through at least one of the screen layers by reflection means.

9. A system as claimed in claim 6, in which prism means are provided for deflecting light from the common source through at least one of the screen layers.

10. A system as claimed in claim 6, in which separate ionic crystal screen layers are provided in a cathode ray tube for reproduction therein of the electric signals representative of the partial colors.

11. In an additive color television system for producing color images comprising, at least two target screens of alkali halide material, means for changing the transparency of each target screen according to partial color signals received, a viewing screen, means for directing a beam of light through each of said target screens and combining the beams in registry upon the viewing screen, the target screens being so positioned that each beam passes through only one target screen, the said target screen being constructed to become transparent in predetermined colors corresponding to the color signals, whereby a complete color reproduction may be established on the viewing screen.

12. A system as claimed in claim 11, in which the various screen layers are arranged in separate cathode ray tubes.

13. A system according to claim 11, in which the screen layers are arranged in one cathode ray tube.

14. A system as claimed in claim 11, in which the different screen layers are portions of a single ionic crystal screen layer, said screen layer portions being spaced side by side.

15. A system as claimed in claim 11, in which the light for the different light beams is produced by separate sources.

16. A system as claimed in claim 11, in which the light for different screen layers is produced by a common source.

17. A system as claimed in claim 16, in which the light produced by the common source is passed to the different screen areas through a common condenser lens system.

18. A system as claimed in claim 16, in which the light produced by the common source is directed through at least one of the screen layers by reflection means.

19. A system as claimed in claim 16, in which prism means are provided for deflecting light from the common source through at least one of the screen layers.

20. A system as claimed in claim 16, in which separate ionic crystal screen layers are provided in a cathode ray tube for reproduction therein of the electric signals representative of the partial colors.

ADOLPH H. ROSENTHAL.

REFERENCES CITED

The following references are of record in the file of this patent:

UNITED STATES PATENTS

| Number | Name | Date |
|---|---|---|
| 2,272,638 | Hardy | Feb. 10, 1942 |
| 2,294,820 | Wilson | Sept. 1, 1942 |
| 2,330,171 | Rosenthal | Sept. 21, 1943 |
| 2,330,172 | Rosenthal | Sept. 21, 1943 |
| 2,386,074 | Sziklai | Oct. 2, 1945 |
| 2,389,646 | Sleeper | Nov. 27, 1945 |
| 2,415,226 | Sziklai | Feb. 4, 1947 |
| 2,423,769 | Goldsmith | July 8, 1947 |
| 2,461,515 | Bronwell | Feb. 15, 1949 |